United States Patent [19]

Robinson et al.

[11] Patent Number: 4,487,747

[45] Date of Patent: Dec. 11, 1984

[54] PRODUCTION OF METAL CHLORIDES

[75] Inventors: Michael Robinson; Alan D. Crosby, both of South Humberside, England

[73] Assignee: Laporte Industries Limited, London, England

[21] Appl. No.: 491,759

[22] Filed: May 5, 1983

[51] Int. Cl.$^3$ .............................................. C22B 1/00
[52] U.S. Cl. ...................................... 423/60; 75/1 R; 75/26
[58] Field of Search ...................... 423/60; 75/1 R, 26

[56] References Cited

U.S. PATENT DOCUMENTS 4,182,747 1/1980 Gravey ................................. 423/60

Primary Examiner—Peter D. Rosenberg
Attorney, Agent, or Firm—Kane, Dalsimer, Kane, Sullivan and Kurucz

[57] ABSTRACT

In the fluidized bed chlorination of materials containing, for example, magnesium, manganese, calcium, iron or chromium oxides which tend to accumulate as chlorides in the bed leading to bed agglomeration, the hot partially chlorinated bed is treated with oxygen containing gas to strip out such chlorides as such or to convert them to oxides after which the chlorination may be continued. The invention may be applied, for example, to the production of titanium tetrachloride from titanium dioxide slag or the production of chromium chloride, from a chromite beneficiate.

15 Claims, No Drawings

PRODUCTION OF METAL CHLORIDES

BACKGROUND OF THE INVENTION

1. Field of the Invention

The present invention relates to the production of metal chlorides by the fluidised bed chlorination of oxidic materials.

2. Brief Description of the Prior Art

Metal chlorides may be used in the metallurgical or pigment industries and for such use may be produced from iron-containing oxidic ores or deposits by an initial beneficiation to remove iron selectively to produce a concentrate having an increased concentration of a desired constituent or constituents followed by the substantially non-selective fluidised bed chlorination of the concentrate to produce a gaseous effluent rich in the chloride of the desired constituent or constituents and containing restricted quantities of chlorides of other chlorinatable ore constituents, if and to the extent present. Examples of beneficiation processes are the electrosmelting of low grade titanium dioxide-containing deposits to produce a titanium dioxide rich slag, which may have a content of titanium dioxide as high as 85% by weight or even higher, and the chlorination beneficiation of ore such as ilmenite or chromite to produce a concentrate which may contain a similar content of titanium dioxide or up to, for example, 60% by weight of chromic oxide.

While the iron content of an ore or deposit may be reduced successfully by beneficiation processes the concentrate so produced usually still contains an appreciable quantity of minor constituents which have not been removed with the iron which give rise to difficulties in conducting a subsequent fluidised bed chlorination step. Certain metal oxides usually present in small but appreciable proportions in oxidic ores or deposits chlorinate to give low melting point chlorides having a low vapour pressure with the result that, at usual chlorination temperatures of about 800° C. to 1100° C., they remain present in the bed in the liquid form and, as the chlorination progresses, gradually build-up in content in the bed and at some point cause bed agglomeration and cessation of the process. More specifically magnesium, manganese and calcium chlorides, the oxides of some or all of which are usually present as minor constituents in oxidic ores, all have melting points below 800° C. and very low vapour pressures. At 800° C., the maximum vapour partial pressure of manganese chloride is below 0.03, of magnesium chloride is below 0.003 and of calcium chloride is below 0.00002 atmospheres. It can be seen from this that even a small content of these chlorides can give rise to problems particularly in continuously operated processes. In some cases a desired ore constituent may itself give rise to similar difficulties. Chromium chloride for example can build up in quantity in a fluidised bed in which chromite is being chlorinated and contribute to the bed agglomeration problems as well as providing a problem of recovery. At 800° C. the maximum partial vapour pressure of chromium chloride is 0.033 atmospheres. At higher temperatures the vapour pressure is higher but nevertheless the problem of retention of chromium chloride in the bed persists. Also other metal chlorides are relatively involatile and can give rise to problems due to accumulation in the bed in the course of the chlorination of an ore or concentrate containing it as a minor constituent.

Many beneficiation processes do not achieve 100% separation of the iron content of ores or ore deposits but may leave up to 5% or even up to 10% or 15% by weight of the ore or deposit in the form of iron oxide. This iron oxide would form a usually undesired constituent of the product of the further chlorination of such a beneficiation. This applies also to certain ores which may in their natural state already be so rich in a desired metal oxide constituent other than iron as to make a separate beneficiation process uneconomic. It is well known that, while ferric chloride has a relatively high vapour pressure and does not present undue problems with regard to fluidised bed chlorination processes ferrous chloride, which is often formed in varying proportions with ferric chloride is subject to many of the problems encountered as a result of the presence of magnesium, manganese or calcium chlorides. Ferrous chloride melts at below 700° C. and at 800° C. has a maximum partial vapour pressure of about 0.08 atmospheres.

In the course of a fluidised bed chlorination in the presence of carbon it is thought that, initially, the carbon may absorb liquid chlorides present in the bed enabling fluidisation to proceed unimpeded for a time, but that the capacity of the carbon to continue to do this then diminishes and that the resulting presence of unabsorbed liquid chlorides in the bed encourages the retention in the bed of chlorides, for example chromium chloride, which would normally be expected to be substantially in the gaseous phase at the bed temperature prevailing. While the above is a theory to which the Applicants do not bind themselves, it does correspond to the observed behavour of fluidised bed processes for the chlorination of materials containing the constituents in question to proceed normally for a time and then to become agglomerated relatively suddenly as if a critical threshhold in the content of substances deleterious to the fluidised state had been reached and exceeded.

Against the above background it can be understood why the fluidised bed chlorination of titanium dioxide slag, which may typically contain about 5–15% $Fe_2O_3$, 0.5–3% MnO, 0.5–5% MgO and up to 0.5% CaO has been found to be difficult. In fact titanium dioxide slag is not generally regarded as chlorinatable on its own on a practicable industrial basis. This problem is acknowledged in Australian Patent No. 237857 which describes a prior proposal to alleviate the problem by withdrawing a large portion of the bed material from the zone of chlorination, washing the bed material to remove fused chlorides and returning the washed residue to the bed. This prior proposal entails cooling the withdrawn portion of the bed to enable it to be washed and reheating it separately to the desired chlorination temperature. This is not practicable in commercial operation in view of the very large heat losses involved. Australian Patent No. 237857 offers as a solution to the problem the use of a specially designed chlorination fluidised bed reactor in which the fluidising chlorine is introduced at a point above the bottom of the fluidised bed and in which there is provision for purging a small portion of the bed material from a point below the point of introduction of the fluidising chlorine in which section of the reactor agglomerated bed particles tend to gather. The amount of the purge of bed materials may be up to 15% of the ore fed to the bed and in one Example the residual titanium content of the purge material was 14% corresponding to a $TiO_2$ content of over 23%. In practice this represents an unacceptable loss of the desired titanium chloride product. A chromite beneficiate may, typically, contain as much as 10-25% $Al_2O_3$ and 5-12% MgO so that, despite a possibly very low content of CaO and MnO, similar problems apply in addition to the problem of retention of chromium chloride in the bed as described above.

The present invention is intended to alleviate, at least partly, the problems discussed above arising from the presence of minor constituents. It may be applied to any ore, ore deposit or ore concentrate of which a desired constituent is chlorinatable to give a vaporous chloride at a temperature above about 800° C. for example from 800° C. to 1100° C. and which contains any appreciable quantity of the relevant constituents for example, without intending limitation to such a minimum quantity, at least 0.2% by weight of one or more of said constituents, with the proviso that calcium oxide should not be present, due to its particularly low vapour pressure, in more than 0.5% by weight. The above references to titanium dioxide slag and chromite beneficiate are, of course, illustrative only.

SUMMARY OF THE INVENTION

According to the present invention, there is provided a new or improved process for the production of metal chlorides by the fluidised bed chlorination by means of chlorine and in the presence of a theoretical excess of carbon of a material containing as a major constituent a metal oxide chlorinatable at a temperature above 800° C. to produce a vaporous metal chloride, which is removed from the bed, and as one or more minor constituents metal oxides the chlorides of which tend to accumulate in the bed, characterised by only partially chlorinating the major constituent and before continuing the chlorination, treating hot bed solids so obtained by subjecting them to the action of an oxygen-containing gas until they are at least partially stripped of chlorides of one or more of the said minor constituents and thereafter continuing the chlorination and removal of the major constituent from the treated bed solids.

DETAILED DESCRIPTION OF THE INVENTION

The action of the oxygen-containing gas on the partially chlorinated bed solids is to oxidise oxidisable metal chlorides present therein and/or as a result of this and of combustion of a part of the excess carbon used in the chlorination and still present in the bed material to maintain, or to develop an increase in, the temperature of the partially chlorinated solids so as to cause the distillation of such chlorides as are not readily oxidisable. In practice, the oxygen treatment is preferably conducted in a fluidised bed the oxygen-containing gas being preferably used to maintain fluidisation. Preferably either air or a gas containing less oxygen than air down to a preferred minimum of 5%, particularly preferably 8%, by volume of oxygen, the remainder being chemically inert gases, is used as the oxygen-containing gas. It may be advantageous to use additives in the oxygen treatment, for example to encourage the conversion of oxides to chlorides. Such additive may be, for example, hydrogen chloride gas. The oxygen-containing gas is preferably used in a quantity which will give slip of unreacted oxygen through the bed into the effluent gas stream to give, for example, a concentration of at least 0.5% by volume thereby preventing the rechlorination of such metal oxides as have been formed by the free chlorine released by the oxidation. Preferably the oxygen treatment is conducted at a temperature, suitably controlled by the concentration of the oxygen during the treatment, at least equal to, and particularly preferably at least 50° C. above, the temperature at which the chlorination is conducted and, in the case where chromite is being chlorinated, very suitably at a temperature of at least 1000° C. and, subject to these constraints, a temperature in the range 950° to 1170° C. is suitable. The degree to which the oxygen treatment step is conducted is a matter for judgement having regard to the particular minor constituents and the quantities to be stripped out. It is not essential to remove such minor constituents completely since a small proportion will be vapourisable in the chlorination bed and a further small proportion will not cause appreciable chlorination bed agglomeration. Suitably sufficient minor constituents are stripped to enable an acceptable state of fluidisation to be maintained in the chlorination bed. However, preferred guidlines for the duration of the oxygen treatment step are set out separately hereinafter.

Under the oxygen treatment conditions envisaged magnesium chloride would mostly distill as such as would manganese chloride. Such chlorides may be condensed and recovered from admixed solids for example by dissolution methods. The condensed chlorides may be combined with those contained in the chlorination bed effluent or may be treated to recover chlorine therefrom, and for such purposes may not require to be recovered from other materials present. Some chlorides present would oxidise and leave the fluidised bed in the form of dust, for example aluminium chloride or iron chloride, admixed with particles of carbon. There may be expected to be entrained in the material to be subjected to treatment with oxygen some of the chloride formed as product from the major constituent of the ore which chloride may, depending on its identity, oxidise. Titanium tetrachloride would oxidise under these conditions unless as much as possible is purged out prior to the oxygen treatment. Chromium chloride represents a special problem in that it is retained to an unexpected degree in the chlorination fluidised bed. When a material containing chromium oxide together with aluminium oxide, such as a beneficiated chromite, has been chlorinated and the resulting bed material is subjected to oxygen treatment according to this invention a substantial minor proportion of the chromium chloride is oxidised to give a dust rich in chromium oxide and aluminium oxide which is readily separable from the accompanying chlorides. This dust may be useful in the production of chromium metal by the thermite process in which the mixed oxides may be mixed with aluminium powder and ignited to give chromium metal and further aluminium oxide. Due to the difference in the change in free energy for the conversion of chromium chloride to the oxide in comparison with the conversion of iron chloride to the oxide there is a tendency in the oxygen treatment bed to selectivity in favour of the further purification of the chromium with respect to iron.

If a greater yield of chromium oxide is required the chlorination bed effluent may be contacted with a restricted quantity of oxygen, preferably less than 50% by volume particularly preferably less than 30% by volume, in other gases which itself tends to give a similar selectivity in favour of chromium oxide in comparison with iron oxide but for a different technical reason. The oxides, combined or separately, may be separated from the accompanying chlorides e.g. by dissolution of the latter and used in the thermite process or they may be recycled to the chlorinator.

In the case where the oxides are to be used in the thermite process it is preferred that the material subjected to the initial chlorination step is a beneficiate already stripped of iron to a major extent and preferably containing less than 10% particularly preferably less than 5% of iron oxides by weight. The initial presence of aluminium oxide is not disadvantageous since the combined aluminium oxides come off as a slag. The combined process is particularly cost effective in view of the high value of chromium metal. The applicant has produced chromium metal by this means and present invention also provides such a combined process. The metal in question may be not only chromium but also any other suitable metal. The chlorine evolved in the course of the oxygen treatment may be recovered from the resulting mixture of oxides and chlorides and recycled after any such purge of inert gas as may be required. To minimise the need for such purge an undue excess of oxygen over that required to obtain the desired limited increase in the temperature of the material being treated, to oxidise any oxidisable chlorides which may be present in the material and to provide a minimum excess to prevent rechlorination, is preferably not used.

The chlorination step according to the invention is preferably conducted using a quantity of carbon, preferably coke, giving from 15% to 50% weight content in the bed. The desired concentration of chlorine used in the chlorination step will depend on the composition of the material being treated but is generally preferred to be at least 20% by volume of the gases entering the bed. Where a chromite beneficiate is being chlorinated the concentration of chlorine is preferably from 25% to 60% and where a titanium dioxide slag is being chlorinated it is preferably from greater than 65%, by volume of the gases entering the bed. The particulate size of the carbon and of the ore, ore deposit, or concentrate to be chlorinated is that known in the art to be suitable for fluidisation processes.

The manner of carrying out the present invention is constrained by the need to make provision for a possible temperature difference between the chlorination and the oxygen treatment process stages. In a normal design of fluidised bed it would not be desirable, on a practical basis, to alternate a flow of chlorine with a flow of oxygen-containing gas in a single bed since temperature variations would cause physical damage to the reactor. It is preferred to conduct the oxygen treatment in a separate bed into which a portion, or the whole, of the chlorination bed may be transferred. Very suitably, a portion of the chlorination bed is continuously or discontinuously transferred to the bed in which the oxygen treatment is to take place and back to the chlorination bed after a suitable average duration of treatment which is determined for a particular case by test results.

An alternative arrangement is to use a single large diameter fluidised bed with an oxygen treatment zone and a chlorination zone, the fluidising gas containing, respectively, oxygen and chlorine in said zones, the natural circulation of fluidised bed particles acting to pass the bed material into and out of the oxidation zone on a random but statistically continuous basis. A suitable construction would be a circular plan bed with a central oxygen treatment zone surrounded by a purge zone in which the fluidising gas is inert, with a peripheral chlorination zone.

Other constructions of suitable apparatus by means of which the objects of the present invention may be achieved will be apparent to those skilled in the art.

The point in the chlorination at which bed degeneration becomes apparent, so rendering the use of the treatment according to the present invention advisable, will depend on a number of factors one of which is the identity of the material being chlorinated. It may be found advantageous as a matter of practice to initiate treatment of the bed solids according to the invention after not substantially more than 10% of the major ore constituent has been chlorinated and, preferably, before more than 60%, particularly preferably before more than 40% of the said constituent has been chlorinated whether or not bed degeneration has become apparent at that stage. If the treatment of the bed solids according to the invention is conducted batchwise it may very suitably be conducted in increments of at least 5%, preferably of from 5% to 33% and particularly preferably of from 5% to 25% of the total chlorination time and for a total duration of at least 25%, preferably of at least 30%, preferably of not more than 100% and particularly preferably of not more than 75% of the total chlorination time. If the treatment according to the invention is conducted continuously the same proportions apply with reference to the average duration of residence of the solids in a treatment zone or separate treatment bed.

The effect of the present invention is to enable the chlorination to be conducted to completion, or more nearly to completion, despite a content of the identified constituents which would normally prevent this. The gas effluent stream from the chlorination bed will primarily comprise the metal chloride product, together with carbon oxides deriving from the combustion of carbon in the bed as required to maintain its temperature and to scavenge oxygen released from oxides in the material being chlorinated and a proportion of chlorides of other metals which may have been present as oxides in the material being chlorinated. Typically, the content of the desired metal chloride in the recoverable solids from the chlorination bed effluent may be as high as 60% or even 75% by weight or more.

One major advance provided by the present invention is the ability to chlorinate titanium dioxide slag, undiluted by other solids, irrespective of its particular balance of minor oxide constituents. A further major advance provided by the invention is the chlorination of chromite with provision for recovering chromium chloride entrained in the bed material.

The invention will now be illustrated by means of the following Examples:

Example 1(a)

illustrates the effect of agglomeration of a fluidised bed after a period of use without the application of the present invention. The subject material is titanium dioxide slag.

Example 1(b)

illustrates the application of the present invention to the fluidised bed chlorination of a titanium dioxide slag and extends to a run of three chlorination steps interspersed by two oxygen treatment steps.

Example 2 illustrates the application of the present invention to the fluidised bed chlorination of chromite ore, and extends to a run of six chlorination steps interspersed with six oxygen treatment steps.

The reactor used in all the examples was a vertically positioned fused silica tube fitted at the bottom with a silica fluidising gas distributor and positioned in a gas fired furnace having walls of insulating brick. The top of the reactor was fitted with a silica-lined cross-piece one arm of which was connectable alternatively to two Inconel (Trade Mark) cyclones each positioned in an oven so that in use it could be maintained at a temperature of 180°–220° C. and thence to an indirectly water cooled condenser and finally an indirectly solid carbon dioxide cooled condenser capable of condensing titanium tetrachloride. The other arm of the cross-piece was supplied with means for a nitrogen purge flow. A pressurised ore hopper system was mounted above the reactor and the ore feed duct entered the top of the reactor vertically and co-axially extending slightly below the cross-piece. A fluidising gas duct was provided leading to the gas distributor. The reactor was also fitted with a bed sampling means, a thermocouple and a bed differential pressure manometer.

Example 1 (a)

The empty silica reactor tube was heated to the working temperature of 950°–1000° C. A mixed feed charge of 25 Kg of rutile ore and 6.5 Kg of regular calcined petroleum coke was then introduced into the reactor fluidising it with 35 l/min (free) nitrogen gas. This formed a bed of depth 1.1 m. When the bed temperature reached approximately 925° C. the fluidising gas flow was changed to chlorine. The only nitrogen in use was purge nitrogen at the reactor top and approximately 0.2 l/min nitrogen passing through the bed resulting from purges on the manometer tapping and the bed sampling valve.

From the time that chlorine gas was admitted, feed charges of titanium dioxide slag and coke were fed from the pressurised hopper system, being 4.5 kg/hr of slag and 1.25 kg/hr of coke fed at ten minute intervals. In this way the slag was chlorinated on a bed of rutile with no accumulation of solid material taking place in the bed. The weight analysis of the slag was:

$TiO_2$ (in total) 86%
$Fe_2O_3$ 10%
MgO 1.1%
MnO 1.6%
CaO 0.14%
$Al_2O_3$ 1.6%
$Cr_2O_3$ less than 0.2%

During chlorination the bed thermocouple registered a temperature in the range 950°–1000° C. within the fluidised bed being at least as high as the surrounding furnace temperature, thereby indicating that this surrounding furnace does not act as a source of heat to the reaction. The bed temperature was regulated to the desired range by slight reduction of the furnace temperature.

After an initial period of approximately three hours the analysis of the gases became steady with the CO/$CO_2$ ratio becoming on average 0.36. Also the $Cl_2$ level in the exhaust gases showed that 99.5% of the $Cl_2$ added was consumed in the bed. The bed was sampled at intervals excess material being returned to the bed with the next feed increment. After approximately 14 hours of reaction the run was brought to an end by the de-fluidisation of the bed. The differential pressure rose markedly and gas flow ceased. The bed was cooled but was not free flowing and could not be discharged via the sampling means. The silica tube was broken and the bed contents examined. The bed was found to be agglomerated.

Bed samples taken during the run and agglomerated bed samples were then analysed for salt content and it was found that there had been an increasing trend in the levels of calcium, magnesium, manganese, and in the last part of the run, iron, salts. These were evidently present in the liquid phase. The agglomerated bed samples typically showed the following w/w analysis of salt content:

| % $CaCl_2$ | % $MgCl_2$ | % $MnCl_2$ | % $FeCl_3$ |
|---|---|---|---|
| 0.02–0.06 | 0.21–0.30 | 1.20–1.26 | 5.20–11.00 |

The iron present in the bed salts and the majority of the iron present in the material accumulated from the Inconel cyclone was in the ferrous form.

In the hour previous to the defluidisation of the bed the $CO/CO_2$ ratio in the exhaust gases had altered to become approximately 1.0 and there had been an increase in the level of $Cl_2$ slippage past the bed.

Example 1(b)

A further quantity of slag having similar composition was chlorinated using the same procedure except that the chlorination was stopped after 12 hours.

The bed was then conditioned by fluidising with 60 litres/min nitrogen with sufficient air being added to give an oxygen concentration of 8% by volume and to maintain the bed temperature at 950° C.–1000° C. for 6 hours. The salt content was then determined and found to be:

| % $CaCl_2$ | % $MgCl_2$ | % $MnCl_2$ | % $FeCl_3$ |
|---|---|---|---|
| 0.02 | 0.002 | 0.003 | 0.004 |

Chlorination was then resumed for a further period of 12 hours after which a further conditioning was conducted in the same manner as described above followed by yet a further 12 hour chlorination to give an initial treatment according to the invention after 33% of the chlorination had been completed each such treatment being for a time equal to 16.66% of the total chlorination time and a total duration of such treatment of 33.3% of the total chlorination time.

Example 2

The same apparatus was used except that the condensers were omitted.

The empty silica reactor was heated to the working temperature of 1000°–1100° C. A mixed feed charge composed from the beds of previous successful runs was then fed. This was composed of 20.25 kg of previously used beneficiated chromite ore and 7.75 kg of coke.

The previously used beneficiated chromite ore had the weight analysis:
67.3% $Cr_2O_3$
0.4% $Fe_2O_3$
24.0% $Al_2O_3$
6.6% MgO
1.7% $SiO_2 + TiO_2$ The bed was fluidised with 50 l/min (free) nitrogen gas and when the fluidised bed reached 1075° C. a mixture of 15 l/min chlorine (free) gas and 35 l/min (free) nitrogen gas was admitted as the chlorinating medium.

From the time that chlorine gas was admitted feed charges of freshly prepared beneficiated chromite ore and coke were fed from the hopper, being 2.125 kg ore and 1.15 kg coke fed at ten minute intervals. The chromite beneficate feed had the weight analysis:

60% $Cr_2O_3$
1.7% $Fe_2O_3$
22.1% $Al_2O_3$
14.5% MgO
2% $SiO_2/TiO_2$
0.2% CaO
less than 0.1% MnO In this way the ore was chlorinated without accumulation of solid material in the bed. During chlorination the bed showed a temperature of 1040°–1090° C. being at least as high as the surrounding furnace showing that the furnace did not contribute heat to the reaction. Gas-borne products of the reaction were cooled and routed through one of the two cyclones prior to sampling and discharge. The $CO/CO_2$ ratio during chlorination settled to an average of 2.0 and the utilisation of $Cl_2$ was 99.5%, from gas analysis.

After approximately 75 minutes it was observed that the bed differential pressure was falling and previous experience of this ore indicated that this showed that a 'rat-hole' was forming in the bed which had become agglomerated with salts.

The chlorine gas flow was stopped, and about half of the bed was withdrawn with the assistance of rodding to break up the agglomerates.

The broken agglomerates of the bed were examined for salt content and found to analyse on a w/w basis:

| % $CrCl_3$ | % $FeCl_3$ | % $MgCl_2$ |
|---|---|---|
| 5.0–5.9 | less than 0.1–0.2 | 0.2–0.4 |

The salts collected in the cyclone were found to analyse on a weight basis:

| | |
|---|---|
| % $CrCl_3$ | 78.5 |
| % $FeCl_3$ | 3.2 |
| % $AlCl_3$ | 1.5 |
| % $MgCl_2$ | 10.1 |
| % Solid Dusts | 6.2 |

The bed remaining in the reactor was then fluidised with air alone using 120 l/min (free) air, routing the cooled gas-borne products of reaction via the alternative cyclone prior to sampling and discharge. The bed temperature rose to 1170° C., the bed differential pressure rose, and after 40 minutes this operation was brought to an end when it was observed that the fumes discharging from the apparatus had become colourless. Analysis of the gas indicated that both $O_2$ and $Cl_2$ were present in the exit gas during this operation at the level of approximately 2 to 3% v/v. The bed was discharged freely without the assistance of rodding and found to be free flowing without the presence of agglomerates.

The portion of agglomerated bed previously removed was then fed to the apparatus and it too was treated with air in the same manner to condition it. After 40 minutes the efflux gases were observed to clear and the bed was discharged, again being free flowing and without the presence of agglomerates.

The conditioned bed from these operations was examined for salts content and analysed as follows:

| % $CrCl_3$ | % $FeCl_3$ | % $MgCl_2$ |
|---|---|---|
| less than 0.1 | less than 0.1 | 0.1–0.3 |

The chlorination of the conditioned bed was resumed. 17.5 kg of the conditioned bed was then recharged to the reactor, and when it had reached 1000° C. under nitrogen, chlorine and nitrogen mixture was admittted as before. Again, feeds of fresh beneficiate and coke were admitted at intervals as before. The gas-borne products of reaction were routed to the first cyclone.

After 70 minutes of chlorination the chlorine and nitrogen mixture was discontinued, air was passed through the bed at the previous high rate of flow and the gas-borne products of reaction were routed to the second cyclone. This conditioning process was continued for 40 minutes.

This procedure was repeated so that a total of six such cycles of operation of chlorination followed by conditioning was conducted, in each case being 70 minutes of chlorination and 40 minutes of conditioning to give an initial treatment according to the invention after 17.7% of the chlorination had been completed each said treatment being for a time equal to 9.4% of the total chlorination time and a total duration of such treatment of 56.5% of the total chlorination time.

In each case it was observed that during the chlorination cycle greater than 99.5% utilisation of chlorine took place with much evolution of CO as opposed to $CO_2$ gas and while conditioning was in progress the $CO_2$ level increased and the chlorine level in the exhaust gases increased.

A typical weight analysis of the bed immediately prior to the conditioning step, after the chlorination step had been stopped, was:

| % $CrCl_3$ | % $FeCl_3$ | % $MgCl_2$ |
|---|---|---|
| 4.2 | 0.2 | 0.2 |

The final bed, after the conditioning operation, was examined for salt content and analysed by weight as follows:

| % $CrCl_3$ | % $FeCl_3$ | % $MgCl_2$ |
|---|---|---|
| 0.3 | less than 0.1 | less than 0.1 |

The bed was in good condition and suitable for further chlorination.

The accumulated gas-borne products of the chlorination steps which were collected in the first cyclone were analysed as follows:

| | |
|---|---|
| % $CrCl_3$ | 46.4 |
| % $FeCl_3$ | 3.5 |
| % $AlCl_3$ | 16.8 |
| % $MgCl_2$ | 21.3 |
| % Solid Dusts | 18.9 |

The accumulated gas-borne products of the conditioning reaction which were collected in the second cyclone were analysed by weight as:

| | |
|---|---|
| % CrCl$_3$ | 42.9 |
| % FeCl$_3$ | 1.1 |
| % AlCl$_3$ | 3.5 |
| % MgCl$_2$ | 23.5 |
| % Solid Dusts | 36.3 |

Approximately equal weights of these products were collected. The salts were readily water soluble and could easily be filtered free from the solid dusts.

The accumulated solid dusts were also analysed.

Those collected in the first cyclone analysed:

| | |
|---|---|
| Total | 18.9 |
| % Cr$_2$O$_3$ | 4.4 |
| % Fe$_2$O$_3$ | 0.04 |
| % Al$_2$O$_3$ | 2.1 |
| % MgO | 0.5 |
| % Loss on Ignition | 11.1 |

Those collected in the second cyclone analysed:

| | |
|---|---|
| Total | 36.3 |
| % Cr$_2$O$_3$ | 10.8 |
| % Fe$_2$O$_3$ | 0.04 |
| % Al$_2$O$_3$ | 4.0 |
| % MgO | 0.8 |
| % Loss on Ignition | 19.2 |

The ratios of Cr to Fe, as the metal, at various stages of the process was:

| | |
|---|---|
| Beneficiate added to bed | 34 to 1 |
| Total effluent gases & dusts | 24 to 1 |
| Total dusts from both cyclones | 186 to 1 |
| Dust from second cyclone | 264 to 1 |

This shows a tendency for the purification of chromium with respect to iron.

We claimed:

1. A process for the production of metal chlorides from a material comprising more than one metal oxide of which metal oxides one is chlorinatable at a temperature above 800° C. to produce a vaporous metal chloride product and the one or more others are chlorinatable at the said temperature to produce metal chlorides which accumulate in the material, the process comprising the steps of
   (a) conducting the fluidised bed chlorination of the material at a temperature above 800° C. in the presence of a quantity of carbon in a theoretical excess over that required to combine with the oxygen content of the metal oxides in the material chlorinatable at the said temperature;
   (b) removing from the fluidised bed vaporous metal chloride product formed in the course of the chlorination;
   (c) interrupting the chlorination of at least a portion of the material in which portion only a part of the metal oxide corresponding to the vaporous metal chloride has become chlorinated;
   (d) treating the said portion of the material by subjecting it, in the form of still hot fluidised bed solids, to the action of an oxygen-containing gas so as to strip the said portion, at least partially, of chlorides accumulated therein;
   (e) continuing the fluidised bed chlorination of the so treated portion of the material at a temperature above 800° C. to chlorinate a further portion of the material therein to produce a further quantity of vaporous metal chloride; and
   (f) removing from the fluidised bed the further quantity of vaporous metal chloride formed in the course of the continued chlorination.

2. A process as claimed in claim 1 wherein the partially chlorinated bed solids are treated by passing the said gas through a fluidised bed of the said bed solids.

3. A process as claimed in claim 1 wherein the partially chlorinated bed solids are continuously or discontinuously removed from the chlorination bed for treatment and are recycled thereto during the continuing operation thereof.

4. A process as claimed in claim 1 wherein the concentration of oxygen in the oxygen-containing gas is sufficient to maintain the treatment temperature at least equal to that at which the chlorination had been conducted.

5. A process as claimed in claim 4 wherein the treatment temperature is from 950° C. to 1170° C..

6. A process as claimed in claim 4 wherein the concentration of oxygen in the treating gas is from 5% v/v to 40% v/v.

7. A process as claimed in claim 1 wherein the total duration of treatment of partially chlorinated bed solids with oxygen containing gas is at least 25% of the total duration of the chlorination thereof.

8. A process as claimed in claim 1 wherein the material chlorinated initially contains at least one or more of magnesium, manganese, iron or chromium oxides.

9. A process as claimed in claim 1 wherein the gaseous effluent from the treatment of partially chlorinated bed solids with an oxygen containing gas is condensed and chlorides removed from the condensate.

10. A process as claimed in claim 9 wherein the recovered chlorides are combined with those contained in the effluent from the chlorination bed.

11. A process as claimed in claim 1 wherein the gaseous effluent from the treatment step is treated to recover oxides therefrom.

12. A process as claimed in claim 11 wherein the recovered oxides are recycled to the chlorination bed.

13. A process as claimed in claim 1 for the production of titanium tetrachloride from titanium dioxide slag.

14. A process as claimed in claim 1 for the production of chromium chloride from chromite.

15. A process as claimed in claim 14 wherein the the chromite contains aluminum oxide in addition to chromium oxide and the gaseous effluent from the treatment of partially chlorinated bed solids with an oxygen containing gas is treated to recover chromium and aluminum oxides therefrom which are used as a raw material in the thermite process for the production of chromium metal.

* * * * *